July 4, 1967 F. ULRICH 3,329,832

TUNNEL DIODE MULTISTABLE STORAGE

Filed June 16, 1964 2 Sheets-Sheet 1

INVENTOR

FRIEDRICH ULRICH

BY [signature]

ATTORNEY

TUNNEL DIODE MULTISTABLE STORAGE

Filed June 16, 1964 2 Sheets-Sheet 2

INVENTOR
FRIEDRICH ULRICH
BY J. M. Whitesel
ATTORNEY

United States Patent Office 3,329,832

Patented July 4, 1967

3,329,832

TUNNEL DIODE MULTISTABLE STORAGE

Friedrich Ulrich, Stuttgart-Bad Cannstatt, Germany, assignor to International Standard Electric Corporation, New York, N.Y., a corporation of Delaware Filed June 16, 1964, Ser. No. 375,451
Claims priority, application Germany, July 11, 1963, St 20,843
4 Claims. (Cl. 307—88.5)

The invention relates to a multistable storage with a series-connection of tunnel diodes having different current-voltage characteristics.

Tunnel diodes are well known semi-conductor devices having an extremely thin potential barrier at p-n junctions. When the energy of a particle on one side of the barrier is elevated sufficiently, the particle can be made to pass through instead of over the barrier. It is as if the barrier contains a tunnel for the particle to pass through.

A known way of using these diodes is to place them in series so that they will breakdown in succession. An output pulse is produced each time that a tunnel diode breaks down. More particularly, a chain of series connected diodes are coupled between the terminals of a power source. To maintain a switching condition, a current is impressed on the chain. The current is larger than the maximum valley current and smaller than the minimum peak current of all the diodes in the chain. Normally, all tunnel diodes are in the low ohmic condition which is characterised by a small voltage drop at each tunnel diode. By storage of arriving pulses, the current flux in the chain is increased until the peak current of a tunnel diode is exceeded. A voltage impulse occurs in the tunnel diode chain and some means interrupts the current in said chain to read out the stored information.

Such storage devices are very simple in construction and operate with very large counting frequencies. Unfortunately, however, it is not easy to provide means for reading out the data stored in the chain of tunnel diodes. More specifically, it may be recalled that initially all diodes are in their low-ohmic state. Then each diode, in succession, switches to its high ohmic state to store the occurrence of an input signal.

When the tunnel diode chain reaches the final position (i.e. when all tunnel diodes are in their high-ohmic condition) which is characterized by a large voltage drop, an indicator in the tunnel diode chain responds and shows the end of the storing process. In such a method of data storage, a pulse sequence occurs which represents the complement of the stored pulse sequence with respect to the total number of the tunnel diodes in the chain. Since this is a series code the conversion of the output code into the original storing code requires an expensive converter circuit arrangement. Moreover, a time loss occurs, because the conversion can be performed only after the storing process is finished.

An object of the invention is to improve the multistable storage of data with a series-connection of tunnel diodes.

Another object of the invention is to provide means for storing data so that a direct read-out is obtained without requiring converters. In this connection, an object is to receive a read out simultaneously with storage.

In accordance with one aspect of this invention, a current is applied to a chain of series-connected tunnel diodes. Each diode has a different current-voltage characteristic. The current is larger than the maximum valley current and smaller than the minimum peak current of all tunnel diodes in the chain. During the storing process, the current flow over the tunnel diode chain is increased repeatedly until it exceeds the peak current of any arbitrary one of the tunnel diodes. During the reading-out process, the current flow over the diodes is reduced repeadedly below a valley current of any arbitrary one of the tunnel diodes. The voltage pulses occurring when a tunnel diode is switched between its two states, influences the storing circuit in one condition and the reading-out circuit in the other condition. This type of storage makes use of the fact that the tunnel diodes have different peak currents as well as different valley currents.

Since voltage leaps of different polarity occur when the tunnel diodes reverse, the storing and reading-out circuit can be controlled in a simple manner. More particularly, during the storing process, the tunnel diodes successively become high-ohmic. Due to the current reversal in the reading-out process, the diodes successively return to the low-ohmic condition. Thus, it is not necessary for the diodes to reverse their state during the storing process in a sequence which is exactly opposite to the sequence of their switching during the reading-out process. Only the absolute number of reverted tunnel diodes is essential for the storing process.

According to a further embodiment of the invention, a flip-flop circuit is used to detect the data storage. The flip-flop is brought into its "one" condition by the storing pulse and returned into its original "zero" position by the voltage pulse occurring when a tunnel diode reverts to the high-ohmic condition. During storage, the current flux furnished by the flip-flop is added to the basic current impressed on the tunnel diode chain. During the reading-out process, the flip-flop circuit is converted to a one-shot-circuit for reversing the current furnished to the tunnel diode chain so that the tunnel diodes periodically return to their normal condition. The current furnished by the one-shot circuit flows until the valley current of a tunnel diode falls below a critical value. Then a voltage impulse of opposite polarity occurs in the tunnel diode chain and triggers the one-shot-circuit. This process is repeated until all tunnel diodes are returned to their low-ohmic condition. An output pulse is produced when the one-shot-circuit furnishes no current to the tunnel diode chain. An output signal results therefrom which corresponds to the input signal and which initiates the reading-out.

The above mentioned and other features of this invention and the manner of obtaining them will become more apparent, and the invention itself will be best understood by reference to the following description of an embodiment of the invention taken in conjunction with the accompanying drawings, in which.

Figure 1:
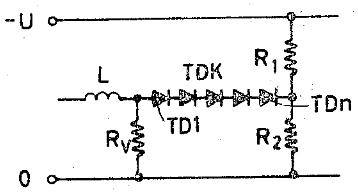
FIG. 1 shows the principal arrangement of the tunnel diode chain circuitry.

The principal arrangement comprising a chain of series connected tunnel diodes TDK is shown in FIG. 1. Each diode has a different current-voltage characteristic. To adapt the output potentials of the control circuit, one end of the chain is connected to a voltage divider $R_1/R_2$ which cuts the negative voltage into halves. The holding current is impressed via the resistor $R_V$. For advancing the chain (during the storing process), the terminal of an inductor L, not facing the chain, must be brought to a zero potential. For backward switching (during the reading-out process), this same terminal is brought to a negative voltage. In this manner, the holding current flowing through the chain is either raised or lowered by the current flowing through the induction coil L.

Figure 2:
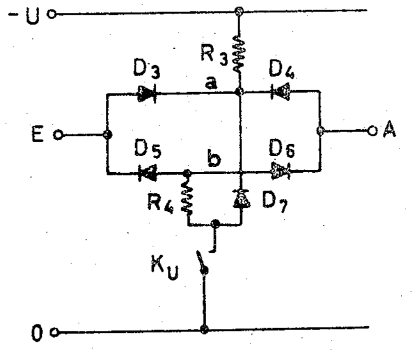
FIG. 2 shows an example of a common control circuit between the chain and flip-flop.

FIG. 2 shows an example of a common control circuit for applying current to the diode chain. The input E of the circuit is connected with a trigger stage and the output A is connected with the inductor L. As pointed out in the third paragraph of this specification, the current is larger than the maximum valley current and smaller than the minimum peak current of all diodes in the chain.

By means of a suitable gate circuit provided between the control circuit and the chain TDK, care is taken so that (during the storing process) the terminal of the inductor L takes either a zero-potential or no potential. This same terminal takes either a negative potential or no potential during the reading-out process.

The common control of FIG. 2 includes two principal parts, having an AND-function. These parts are the diode $D_3$ with the contact $K_U$ and the diode $D_5$ again with contact $K_U$. Thus, the terminal *a* can accept only negative potential, when the input is negative and the contact $K_U$ is open. The negative potential is applied through the resistor $R_3$. The terminal *b* can have only zero potential when the input is a zero potential and the resistor $R_4$ is connected to either zero potential or positive potential via the contact $K_U$. By inserting the diodes $D_4$ and $D_6$ as shown in the drawing, only negative potential is transmitted from the terminal *a* and only positive potential from the terminal *b*, to the output. The diode $D_7$ prevents an undesired coupling between the terminals *a* and *b*.

When the contact $K_U$ is open, the circuit transmits only negative potential and, when closed, only positive potential.

Figure 3:
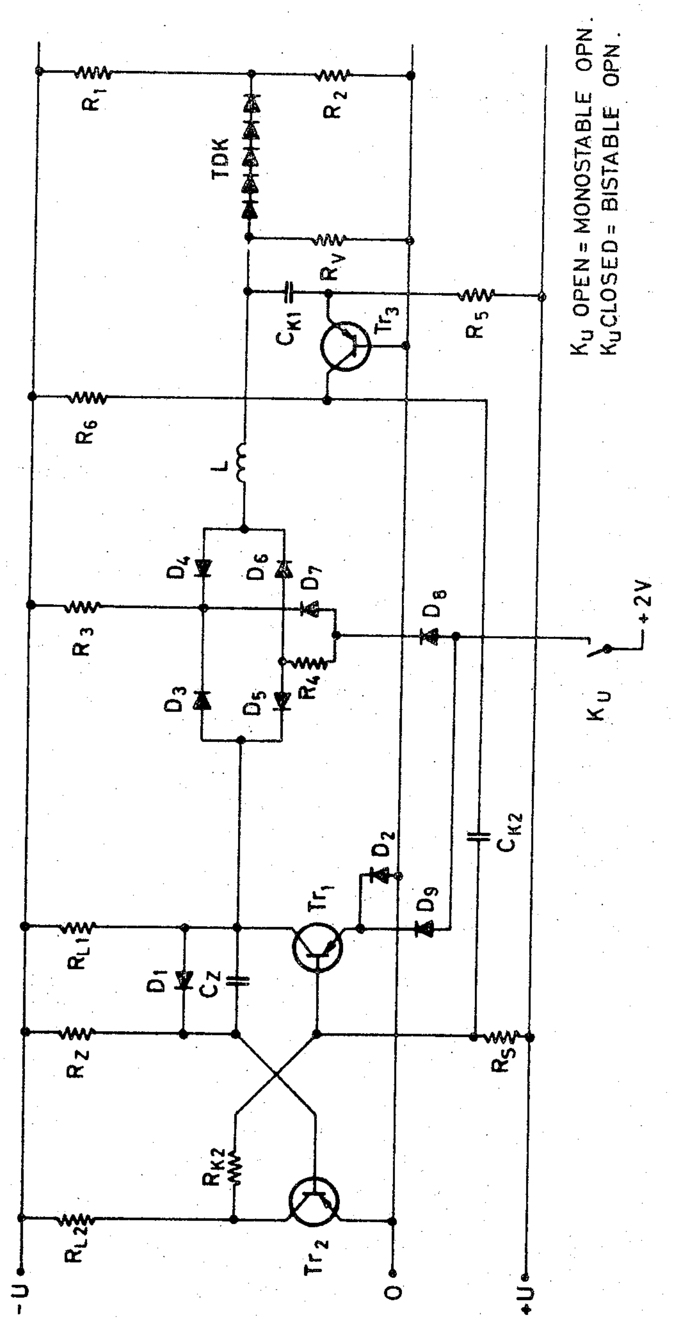
FIG. 3 shows an example of the multistable storage according to the invention.

The entire circuitry of the multistable storage device constructed according to the invention is shown in FIG. 3.

The basic trigger circuit is a multivibrator which can be switched over from monostable to bistable operation. The trigger circuit consists of the transistors $Tr_1$ and $Tr_2$ and the load resistors $R_{L1}$ and $R_{L2}$. Coupling from transistor $Tr_1$ to transistor $Tr_2$ is made through the control contact $K_U$. When the contact $K_U$ is closed, the circuit operates in a bistable mode (that is, it will remain on the side to which it is set).

When contact $K_U$ is open and the transistor $Tr_1$ is conductive, the potential at its collector is made more negative because a voltage is applied through the diode $D_2$. The base of transistor $Tr_2$ can become only slightly negative. Therefore, the diode $D_1$ always remains blocked and the circuit operates in a monostable mode (that is, regardless of how it is set, it always returns to the same side).

The tunnel diode chain TDK is connected to the collector of transistor $Tr_1$. When the trigger stage is switched over from one mode of operation to another, the gate circuit is also simultaneously switched over through the common contact $K_U$. Thus, during the bistable condition ($K_U$ closed) only zero potential is applied to the left-hand end of inductor L, which is an energy storage means. During the monostable condition ($K_U$ open) only negative potentials reach the inductor. The inductor and relay circuits cooperate to read in responsive to pulses received during bistable operation and to read out during monostable operation.

To write data into the tunnel diode chain, successive current pulses are applied through the inductor L to the chain of diodes TDK. Each pulse stores energy in the magnetic field of the inductor, and—in the known manner—current increases slowly at a rate set by the inductor characteristic as it responds to energy in the pulse. Soon the current in the diode chain exceeds the switching level of the diode having the lowest current level firing characteristics, and it turns on. The turned on diode subtracts its "off" condition high resistance from the chain; therefore, the next pulse produces a higher current, and the next to lowest current firing diode turns on. The process repeats as each firing pulse is received. Thus, the total number of turned on diodes corresponds to the total number of pulses that are received.

Transistor $Tr_1$ is blocked after completion of data storing. This switching condition ($Tr_1$ blocked) of the flip-flop is also the stable one for the one-shot circuit operation. Therefore, this initial condition remains even after switching over due to the opening of contact $K_U$.

After contact $K_U$ has opened to cause read-out, the gate circuit transfers the negative potential from the collector of transistor $Tr_1$ to the inductor L. The current flowing through the tunnel diode chain TDK is reduced until one of the high-ohmic tunnel diodes is turned back into the low-ohmic condition. This causes a negative read-out signal at the connecting point between the tunnel diode chain and the inductor. This negative potential is applied to the base of transistor $Tr_1$ and triggers the one-shot circuit into the non-stabe condition (transistor $Tr_1$ becomes conductive). This causes the current flowing through the diode chain TDK to rise to the holding value. After the operative period of the one-shot circuit has elapsed the transistor $Tr_1$ is again blocked etc.

Each time that a diode turns off in the chain TDK, it restores its high "off" resistance to the total resistance of the diode chain, thus increasing the IR drop and lowering the level of current in the chain. The inductor L and capacitor $C_{K1}$ tend to regulate the fall time of the decreasing current and, therefore, the turn off time of a diode. When the current falls sufficiently, the diode having the next lower current response characteristic turns off to repeat the process. Operating in its monostable mode, the transistors $Tr_1$ and $Tr_2$ form an output pulse each time that a tunnel diode turns off.

Depending upon the direction of advancing, the tunnel diode chain TDK furnishes either positive or negative output signals. The output signals, furnished by the tunnel diode chain are amplified since the negative signals are applied to the positively biased base of transistor $Tr_1$, via the coupling capacitors $C_{K1}$ and $C_{K2}$. To this end the transistor $Tr_3$ is used, together with the resistors $R_5$ and $R_6$, as an amplifier operating in a grounded base circuit configuration. When the last tunnel diode switches back to its low-ohmic state, the transistor $Tr_1$ is made conductive once more and thereafter remains blocked.

Figure 4:
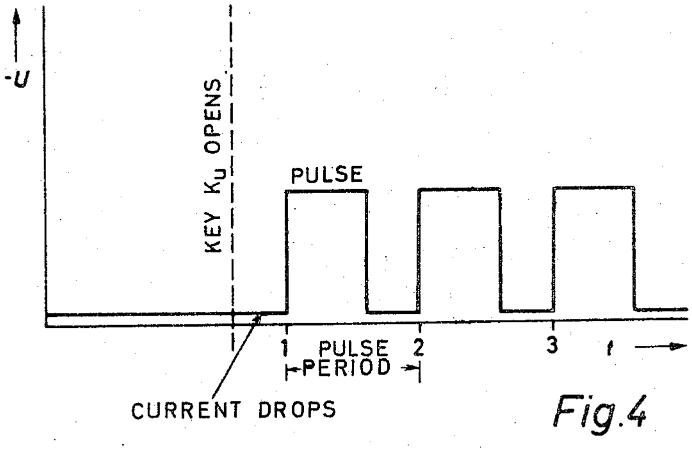
FIG. 4 shows the output signal at the trigger during the reading-out process.

The voltage curve at the collector of transistor $Tr_2$ is qualitatively represented in FIG. 4.

It is assumed that three pulses are stored, i.e. that three tunnel diodes are in their high-ohmic condition. When contact $K_U$ opens, the collector of transistor $Tr_1$ remains at the low negative voltage. The current in the chain circuit TDK starts to reduce. At the moment 1 (FIG. 4) the first of the three tunnel diodes is restored to its low-ohmic condition and the transistor $Tr_2$ is blocked. At the moment 3, the last one of the tunnel diodes which was brought into the high-ohmic condition (due to the storing process) is restored to is low-ohmic condition. Then, its transistor $Tr_2$ is cut off. After the operative period of the multivibrator has elapsed the transistor $Tr_2$ changes into the conductive condition and remains in this condition. Therefore three negative output pulses are obtained (assuming that three pulses were previously stored).

While the principles of the invention have been described above in connection with specific apparatus and applications, it is to be understood that this description is made only by way of example and not as a limitation on the scope of the invention.

I claim:

1. A multistage data storage circuit comprising a chain of series connected tunnel diodes, each of said diodes having a different current-voltage characteristic, means for applying a current to said chain, said current being larger than the maximum valley current and smaller than the minimum peak current of all of said tunnel diodes in said chain, storage means responsive to each in a series of input pulse conditions for increasing the current in said chain until any one of said diodes changes it ohmic state whereby a number of said diodes have changed their ohmic states corresponding to the number of input pulses which have been received, readout means for reducing the current in said chain until any arbitrary one of said changed state diodes returns to its normal ohmic state, and means for successively so reducing said current until said tunnel diode chain has counted down to zero.

2. The circuit of claim 1 and means for detecting a voltage change each time that a diode returns to normal, and means responsive to said voltage changes for indicating the values stored in said chain.

3. The circuit for claim 1 and a bistable flip-flop circuit for controlling data storage, means for switching said flip-flop circuit to one state to store a pulse, and means for switching said flip-flop back to the other state responsive to a voltage change occurring when a tunnel diode changes state.

4. The circuit of claim 1 and a flip-flop, means for causing said flip-flop to operate in a monostable manner, and means for successively causing said monostable flip-flop to reduce the current in said chain to cause said read-out.

References Cited

Hemel: "Tunnel-Diode Transistor Circuits Simplify Counters," Electronic Design (mag.), Sept. 13, 1963, pp. 64 to 68. (p. 68 relied on).

ARTHUR GAUSS, *Primary Examiner.*

D. D. FORRER, *Assistant Examiner.*